United States Patent [19]

Lindert

[11] Patent Number: 4,465,816

[45] Date of Patent: Aug. 14, 1984

[54] STABLE WATER-BORNE EPOXY RESIN

[75] Inventor: Andreas Lindert, Troy, Mich.

[73] Assignee: Parker Chemical Company, Madison Heights, Mich.

[21] Appl. No.: 210,909

[22] Filed: Nov. 28, 1980

[51] Int. Cl.³ .................. C08F 283/10; C08G 8/30; C08L 61/14; C08L 63/10
[52] U.S. Cl. .................................. 525/488; 525/529; 523/414; 523/423
[58] Field of Search ............... 525/529, 530, 531, 532, 525/488; 260/29.2 EP; 523/414, 423

[56] References Cited

U.S. PATENT DOCUMENTS

| | | | |
|---|---|---|---|
| 3,288,766 | 11/1966 | Greenlee et al. | 525/529 |
| 3,670,047 | 6/1972 | Broecker | 525/530 |
| 3,694,407 | 9/1972 | Krikorian | 525/529 |
| 3,844,998 | 10/1974 | Jeffrey et al. | 260/29.2 EP |
| 4,308,367 | 12/1981 | Green et al. | 525/529 |

FOREIGN PATENT DOCUMENTS 704313  2/1965  Canada ............................. 525/488

*Primary Examiner*—John C. Bleutge
*Assistant Examiner*—Robert E. L. Sellers
*Attorney, Agent, or Firm*—Arthur E. Kluegel

[57] ABSTRACT

A stable, water soluble epoxy resin suitable for use as a coating material is made by grafting a thio-acid onto an unsaturated functional site on an epoxy resin backbone.

27 Claims, No Drawings

STABLE WATER-BORNE EPOXY RESIN

BACKGROUND OF THE INVENTION

The present invention relates to water soluble or dispersible epoxy resins which are useful for surface coatings, particularly on metal surfaces such as steel, galvanized metal and aluminum.

Epoxy resins generally have good adhesion and chemical resistance characteristics and are well known for use as protective coatings on metal surfaces. Unfortunately, although it would be advantageous to have water-soluble epoxy resins for use as surface coatings, most epoxy resins are insoluble in water and hence, are applied either as 100 percent solids or by means of an organic solvent. Epoxy resins can be modified to be water-soluble or dispersible but such modification can result in certain disadvantages.

For example, epoxy resins can be emulsified in water using emulsifying agents and applied as coatings. However, use of emulsifiers increases the sensitivity of the coatings to chemical and humidity attack. Alternatively, an epoxy ester can be made from an epoxy resin. The epoxy ester can then be made water dispersible or water soluble by reacting the ester with a base. For example, an epoxy resin can be reacted with a fatty acid or an organic acid, the reaction product of which can then be reacted with an anhydride such as maleic anhydride, phthalic anhydride, succinic anhydride, trimellitic anhydride or the like to generate carboxylic acid functionality and water dispersibility. Unfortunately, the product is sensitive to ester hydrolysis and precipitates upon storage in water.

It is an object of the present invention to provide a process for providing a water soluble or dispersible epoxy resin suitable for use in coating compositions. Another object of the present invention is to provide an epoxy resin which is water soluble or dispersible but has good stability. Still another object of the present invention is to provide an epoxy resin which can be applied as a coating which has good coating characteristics with regard to resistance to attack by chemicals and humidity. These and other objects of the present invention will be apparent from the following disclosure. All parts and percentages herein are percent by weight unless otherwise indicated.

SUMMARY OF THE INVENTION

An epoxy resin which is water soluble or dispersible and is suitable for use in a coating composition is provided by providing an epoxy resin backbone having an organic unsaturated functional site, grafting a thio acid onto the backbone in a free radical initiated chain reaction, and then neutralizing the carboxylic acid functional groups. The final product is a polyhydric phenol or polyether alcohol which is readily dispersible or soluble in water and is stable therein.

DESCRIPTION OF THE INVENTION

In accordance with the present invention a modified epoxy resin is synthesized in a two step process. First, a low molecular weight epoxy resin is upstaged in a reaction with a multifunctional monomer having a functional moiety capable of reacting with the oxirane moiety of the epoxy resin and at least one functional moiety comprising an organic unsaturated site capable of subsequent free radical addition reaction with a thio acid. The reaction product of the first step is an epoxy resin backbone with organic unsaturated functional sites. Second, the reaction product of step 1 is reacted with a thio-acid in a free radical reaction. In this second step, a sufficient amount of the thio-acid is grafted onto the epoxy resin at the unsaturated functional sites thereof to provide an epoxy resin product which, upon neutralization with a suitable base, is water soluble or dispersible and stable. An aqueous composition comprising the epoxy resin product is suitable for use as a coating composition.

The reaction of step 1 is carried out at high temperature under conventional conditions for epoxy upstaging, i.e. condensation, reactions. Suitable lower molecular weight epoxy resin starting materials include epoxy resins conventionally used in epoxy upstaging reactions and include aliphatic diepoxides such as 1,4-bis (2,3 epoxypropoxy butane); 4 (1,2-epoxyethyl) 1,2-epoxycyclohexane; and many similar aliphatic epoxy compounds. Aromatic diepoxides are also suitable for use in the first step of the present invention and are preferred for use herein. The glycidyl ether of 4,4'sec-butylidenediphenol or 4,4'isopropylidenediphenol are especially preferred for use herein as are commercially available pre-catalyzed epoxy resins such as Epon 829 from Shell Chemical Company or DER 333 from Dow Chemical Corporation.

A variety of multi-functional monomers with an unsaturated double bond moiety can be employed in the first step of the present invention to react with the lower molecular weight epoxy compound. Useful monomers are those containing an unsaturated double bond and a reactive site which will react with the oxirane moiety of the epoxy compound. Suitable monomers include: 2,2-bis (4-hydroxy-3 allylphenyl) propane and epoxidized butadienes; and mono, di and tri methylol derivatives of O-allylphenol and similar methylol derivatives of allylphenols. Of course, it will be appreciated that these derivatives are perhaps best employed by first upstaging the epoxy compound and then condensing the upstaged epoxy with the derivation in a conventional manner.

Optionally, diphenols, such as Bisphenol A or isopropylidenediphenol can be co-reacted with the lower molecular weight epoxy compound and the prepolymer. A higher molecular weight epoxy resin containing the unsaturated organic group is obtained by the resulting fusion reaction.

When reacting Epon 829 or DER 333 with the multifunctional monomer component and optionally isopropylidenediphenol, the reaction mixture can be calculated on a theoretical basis in such proportions that the polymer end groups are oxirane groups, mixtures of oxirane and phenolic end groups or the reaction components can be adjusted to yield phenolic end group components predominantly. It is, however, preferable to avoid phenolic end groups to prevent their subsequent interference with the reaction of step 2. In an alternate procedure, to the reaction of Epon 829, multifunctional monomer component, and optionally isopropylidenediphenol, can be added a monofunctional phenol or oxirane to partially or completely terminate the epoxy polymer resin chain. Useful monofunctional components include: alkylated (methyl, ethyl, propyl, butyl, nonyl, dodecyl, etc.) phenols, ortho and para phenyl phenol, phenyl o-cresol, cymel phenol, alkoxy-2,3 epoxypropane—such as, for example, epoxide 7 and 8 produced by the Procter & Gamble Company, butyl glycidyl ether, phenyl glycidyl ether, xylenol, phenol, cresol, naphthol, glycidyl ether of cumylphenol, cresyl glycidyl ether, cordura E, and $C_{12}$-$C_{20}$ olefin oxides.

Preferably, terminating groups which also contain an unsaturated site which can be used in step two of the present invention as a grafting site are employed. Examples of such compounds include: phenols derivated from cashew nut liquids, as well as the glycidyl ethers of such phenols such as the commercially available compounds, Cardolite NC-700 and NC-513 of the 3M Company, allyl glycidyl ether, 2-allyl phenol, and eugenol. These compounds when located on the epoxy resin provide additional sites for free radical grafting, although by themselves give unstable emulsions when used to make higher molecular weight epoxy resins.

In step 2 of the present invention the reaction product of step 1 is reacted with a thio-acid in a radical reaction to graft the thio acid onto the modified epoxy backbone as the aforementioned unsaturated sites. Thio-acids suitable for use in this radical grafting process include thio-acids which contain the thio group and one or more carboxylic acid groups in the same molecule. Examples of thio-acids which are useful and are preferred for use in the present invention include 3-mercaptopropionic acid, 2-mercaptoacetic acid, 2-mercaptopropionic acid, 2-mercaptosuccinic acid and the like. Generally speaking, however, the range of organic compounds having a thio moiety and a carboxylic acid moiety are included within the broad scope of the present invention.

The amount of unsaturation on the modified epoxy resin and the amount of thio-acid employed herein must be sufficient to obtain, upon neutralization of the acid groups, water dispersibility or solubility. Generally, an acid number above at least 10 must be obtained in order to make the product water dispersible. For long term stability and for practical coating use, the actual acid number of the final product should be at least about 15, will generally be from about 15 to about 150, but is preferably from 25 to 80.

The reaction of the second step of the present invention can be carried out in a manner conventional for free radical initiated reactions. The initiator used in the polymerization can be any radical forming compound used for such purposes. Azobisisobutyro-nitrile, t-butyl per octoate, cumene hydroperoxide, benzoyl peroxide and many compounds of a similar nature are suitable for use as initiators herein. Initiators are commonly used in amounts ranging from about 2 to about 7 percent. The choice and amount of initiator depends, of course, upon the reaction temperature which, broadly speaking, can be varied from 30° C. to 150° C. In most practical reaction systems, the reaction temperature is maintained between 70° C. to 130° C. The reaction can be run both in bulk and in solvents, but at lower reaction temperatures it is advantageous to use solvents to reduce the viscosity of the reaction medium. In addition, although stable and useful products can be obtained at temperatures above 120° C., a side reaction becomes more prevalent at temperatures much above 120° C. and the actual acid number is reduced apparently due to ester formation of the carboxylic acid with the epoxy resin and solvent.

After the thio acid is grafted onto the modified epoxy resin, the product is neutralized with a base to provide the desired water soluble or dispersible product suitable for use in an epoxy coating composition. An amino base is preferred since a volatile amine base will be removed from the final coating during the drying and curing process. Suitable bases include lithium, sodium or potassium hydroxide, ammonia, dimethylethanolamine, and the like. Generally, the pH of the aqueous coating composition will be from about 6 to about 10. The exact concentration of epoxy compound in the coating solution can vary over a wide range. For example, for dip coating a 2% solution might be desirable while for spray coating a 30% solution might be desirable. Of course, the epoxy compound can be in concentrate form or even in 100% solids form. Suitable concentrates for marketing the epoxy compound to end users might comprise, for example, from 70–90% of the epoxy. Of course, an aqueous based coating composition of the present invention can comprise optional ingredients in addition to the neutralized stable epoxy compound of the present invention. Suitable optional ingredients include cross-linking agents, flow agents, wetting agents, and the like.

The following example further illustrates the present invention.

EXAMPLE

A reaction flask equipped with an overhead stirrer thermometer and nitrogen bubbles was used for the reaction. The following ingredients were charged to the reactor and heated to 185° C.±2° C. for two hours:

| Ingredient | Parts by Weight |
| --- | --- |
| Shell Epon 829 | = 550.0 |
| 2, 2'bis (4 hydroxy-3-allyl-phenyl) propane | = 68.7 |
| Bisphenol A | = 234.3 |
| Dodecylphenol | = 68.7 |

The reaction mixture was then cooled to 150° C. and 200 parts of butyl cellosolve solvent was added. The reaction mixture was then adjusted to 115° C.±5° C. and 66.8 parts of thiomalic acid added. An amount of 6.7 parts of t-butylperoctoate (56%) catalyst and 4.8 parts of t-butyl peroxide (70%) initiator was dissolved in 47.2 parts of butyl cellosolve solvent. Ten percent of the catalyst-activator-solvent mixture was added all at once and the remainder added over a three hour period to the reaction mixture. After a total of four hours, the reaction was cooled and bottled. The reaction product had 80% solids content and an acid number of 35. Two hundred fifty parts of the reaction product (80% solids content) were added to a 1500 ml container and then 50 parts of Cymel 303 and 11.1 parts of dimethylethanolamine were added and the contents stirred well. Finally, 688.9 parts of deionized water were added slowly until all was in the container. The final product was characterized by the following:

| Solvents by wt. in volatiles | = 8.3% |
| --- | --- |
| pH | = 8.5–8.8 |
| Solids | = 25% |
| Viscosity #4 Ford Cup | = 20 second at 72° F. |

The final product is an aqueous solution suitable for use as an epoxy coating solution, such as a coating for aluminum, steel and galvanized metal.

What is claimed is:

1. A free radical reaction product of an epoxy resin backbone having an organic unsaturated functional site and a thio acid, said epoxy resin backbone being the reaction product of a lower molecular weight epoxy compound having terminal oxirane groups and a multifunctional monomer having a functional moiety reactive with an oxirane moiety of said epoxy compound and a functional moiety comprising an organic unsaturated functional site, said resulting epoxy resin backbone being further reacted, in a free radical initiated chain reaction, with said thio acid to graft said thio acid onto said epoxy resin backbone at the unsaturated functional site, the amounts of said epoxy resin, multifunctional monomer and thio acid being such that the said reaction product from the free radical reaction has an actual acid number of at least 10.

2. The product of claim 1 wherein said epoxy resin backbone is the reaction product of said lower molecular weight epoxy compound, said monomer, and in addition, a diphenol compound.

3. The product of claim 2 wherein said lower molecular weight epoxy compound is an aliphatic diepoxide.

4. The product of claim 2 wherein said lower molecular weight compound is an aromatic diepoxide.

5. The product of claim 3 wherein said aliphatic diepoxide is selected from the group consisting of 1,4-bis (2,3 epoxypropoxy butane), 4 (1,2-epoxyethyl) 1,2-epoxycyclohexane and mixtures thereof.

6. The product of claim 4 wherein said aromatic diepoxide is selected from the group consisting of glycidyl ether of 4,4$^1$ sec-butylidenediphenol, 4,4$^1$ isopropylidenediphenol and mixtures thereof.

7. The product of claim 1 wherein said multifunctional monomer is selected from the group consisting of 2,2-bis (4-hydroxy-3 allylphenyl) propane, epoxidized butadienes, and mono, di and tri methylol derivatives of allylphenols.

8. The product of claim 1 wherein said thio-acid is selected from the group consisting of 3-mercaptopropionic acid, 2-mercaptoacetic acid, 2-mercaptopropionic acid, 2-mercaptosuccinic acid, and mixtures thereof.

9. The free radical reaction product of claim 1 wherein:
the lower molecular weight epoxy compound is selected from the group consisting of 1,4-bis (b 2,3 epoxypropoxy) butane 4 (1,2-epoxyethyl) 1,2-epoxycyclohexane, glycidyl ether of 4,4$^1$ sec-butylidenediphenol, 4,4$^1$ isopropylidenediphenol and mixtures thereof;
the multifunctional monomer is selected from the group consisting of 2,2-bis (4-hydroxy-3 allylphenyl) propane, epoxidized butadienes, and mono, di and tri methylol derivatives of allylphenols; and
the thio acid is selected from the group consisting of 3-mercaptopropionic acid, 2-mercaptoacetic acid, 2-mercaptopropionic acid, 2-mercaptosuccinic acid, and mixtures thereof.

10. An aqueous composition comprising the water solubilized, free radical reaction product of claim 1.

11. The composition of claim 10 wherein said epoxy resin backbone is the reaction product of said lower molecular weight epoxy compound, said monomer, and in addition, a diphenol compound.

12. The composition of claim 11 wherein said lower molecular weight epoxy compound is an aliphatic epoxide.

13. The composition of claim 11 wherein said lower molecular weight compound is an aromatic diepoxide.

14. The composition of claim 12 wherein said aliphatic diepoxide is selected from the group consisting of 1,4-bis (2,3 epoxypropoxy) butane, 4 (1,2-epoxyethyl) 1,2-epoxycyclohexane and mixtures thereof.

15. The composition of claim 13 wherein said aromatic diepoxide is selected from the group consisting of glycidyl ether of 4,4$^1$ sec-butylidenediphenol, 4,4$^1$ isopropylidenediphenol and mixtures thereof.

16. The composition of claim 10 wherein said multifunctional monomer is selected from the group consisting of 2,2-bis (4-hydroxy-3 allylphenyl) propane, epoxidized butadienes, and mono, di and tri methylol derivatives of allylphenols.

17. The composition of claim 11 wherein said thio-acid is selected from the group consisting of 3-mercaptopropionic acid, 2-mercaptoacetic acid, 2-mercaptopropionic acid, 2-mercaptosuccinic acid, and mixtures thereof.

18. An aqueous composition comprising the water solubilized, free radical reaction product of claim 10 wherein:
the lower molecular weight epoxy compound is selected from the group consisting of 1,4-bis (2,3-epoxypropoxy) butane 4 (1,2-epoxyethyl) 1,2-epoxycyclohexane, glycidyl ether of 4,4$^1$ sec-butylidenediphenol, 4,4$^1$ isopropylidenediphenol and mixtures thereof;
the multifunctional monomer is selected from the group consisting of 2,2-bis (4-hydroxy-3 allylphenyl) propane, epoxidized butadienes, and mono, di and tri methylol derivatives of allylphenols; and
the thio acid is selected from the group consisting of 3-mercaptopropionic acid, 2-mercaptoacetic acid, 2-mercaptopropionic acid, 2-mercaptosuccinic acid, and mixtures thereof.

19. A process for making an aqueous based coating composition comprising the steps of:
providing an epoxy resin backbone having an organic unsaturated functional site, said epoxy resin backbone being made by reacting a low molecular weight epoxy compound having terminal oxirane groups and a multi-functional monomer having a functional moiety reactive with an oxirane moiety of said low molecular weight epoxy compound and a functional moiety comprising an organic unsaturated functional site;
grafting a thio acid onto said epoxy resin backbone at the unsaturated functional site in a free radical initiated chain reaction; and
neutralizing the acidic moieties of said thio acid in an aqueous medium;
the amounts of said epoxy compound, multi-functional monomer and thio acid being such that the reaction product from the free radical reaction has an actual acid number of at least 10.

20. The process of claim 19 wherein said epoxy resin backbone is made by reacting said low molecular weight epoxy compound, said monomer and, in addition, a diphenol compound.

21. The process of claim 20 wherein said lower molecular weight epoxy compound is an aliphatic diepoxide.

22. The process of claim 20 wherein said lower molecular weight compound is an aromatic diepoxide.

23. The process of claim 21 wherein said aliphatic diepoxide selected from the group consisting of 1,4-bis (2,3 epoxypropoxy) butane, 4 (1,2-epoxyethyl) 1,2-epoxycyclohexane and mixtures thereof.

24. The process of claim 22 wherein said aromatic diepoxide is selected from the group consisting of glycidyl ether of 4,4$^1$ sec-butylidenediphenol, 4,4$^1$ isopropylidenediphenol and mixtures thereof.

25. The process of claim 19 wherein said multifunctional monomer is selected from the group consisting of 2,2-bis (4-hydroxy-3 allylphenyl) propane, epoxidized butadienes, and mono, di and tri methylol derivatives of allylphenols.

26. The process of claim 19 wherein said thio-acid is selected from the group consisting of 3-mercaptopropionic acid, 2-mercaptoacetic acid, 2-mercaptopropionic acid, 2-mercaptosuccinic acid, and mixtures thereof.

27. The process of claim 19 comprising the steps of:
providing an epoxy resin backbone having an organic unsaturated functional site by reacting:
an epoxy compound selected from the group consisting of 1,4-bis (2,3 epoxypropoxy butane), 4 (1,2-epoxyethyl) 1,2-epoxycyclohexane;
glycidyl ether of 4,4$^1$ sec-butylidenediphenol, 4,4$^1$ isopropylidenediphenol and mixtures thereof;
a multifunctional monomer selected from the group consisting of 2,2-bis (4-hydroxy-3 allylphenyl) propane, epoxidized butadienes, and mono, di and tri methylol derivatives of allylphenols; and
a diphenol compound;
grafting a thio acid onto said epoxy resin backbone in a free radical initiated chain reaction, said thio acid being selected from the group consisting of 3-mercaptopropionic acid, 2-mercaptoacetic acid, 2-mercaptopropionic acid, 2-mercaptosuccinic acid, and mixtures thereof; and
neutralizing the acidic moieties of said thio acid in an aqueous medium.

* * * * *